(12) United States Patent
Bando et al.

(10) Patent No.: US 9,709,391 B2
(45) Date of Patent: Jul. 18, 2017

(54) POSITION CALCULATING SYSTEM AND HAULAGE VEHICLE

(71) Applicant: Hitachi Construction Machinery Co., Ltd., Tokyo (JP)

(72) Inventors: Mikio Bando, Tokyo (JP); Hidefumi Ishimoto, Tsuchiura (JP); Shinjiro Saito, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 32 days.

(21) Appl. No.: 14/837,304

(22) Filed: Aug. 27, 2015

(65) Prior Publication Data

US 2016/0069675 A1   Mar. 10, 2016

(30) Foreign Application Priority Data

Sep. 4, 2014  (JP) ................................. 2014-180456

(51) Int. Cl.
| | | |
|---|---|---|
| G01B 21/00 | (2006.01) | |
| G01P 3/00 | (2006.01) | |
| G01C 21/16 | (2006.01) | |

(52) U.S. Cl.
CPC ............. *G01B 21/00* (2013.01); *G01C 21/16* (2013.01); *G01P 3/00* (2013.01)

(58) Field of Classification Search
CPC .......... G01C 21/16; G01C 9/08; G01C 19/28; G01C 19/30; G01C 19/46; G01C 19/48; G01C 19/50; G01C 19/52; G01C 19/54; G01C 19/668; G01C 19/728; G01P 3/00; G01P 15/16; G01P 15/14; G01B 21/00; G01B 7/30; B60G 17/00; B60G 17/016; B60G 17/017; B60G 17/0182; B60G 17/01908; B60G 17/01941

USPC .................................................... 701/37, 38
See application file for complete search history.

(56) References Cited

U.S. PATENT DOCUMENTS

| | | | | |
|---|---|---|---|---|
| 5,136,513 A | * | 8/1992 | Sol ..................... | B60G 17/0164 701/124 |
| 5,986,583 A | * | 11/1999 | Nakano .................. | G01C 21/16 340/988 |
| 6,282,496 B1 | * | 8/2001 | Chowdhary ........... | G01C 21/26 342/357.31 |

(Continued)

FOREIGN PATENT DOCUMENTS

JP   WO 2013122065 A1 *   8/2013  ............. E01C 23/01

*Primary Examiner* — Stephen Holwerda
(74) *Attorney, Agent, or Firm* — Mattingly & Malur, PC

(57) ABSTRACT

A position calculating system for a haulage vehicle including wheels and a body frame mounted on the wheels. The system includes an attitude detection sensor fixed on the body frame, a wheel rotational speed sensor, a loading status information acquiring unit, a correction amount setting unit, a velocity vector calculating unit, and a position calculating unit. The loading status information acquiring unit acquires loading status information indicating whether the body frame is in a loaded state or in an unloaded state. The correction amount setting unit calculates, based on the attitude information, a correction amount required for bringing detection axes in the loaded state into coincidence with corresponding detection axes in the unloaded state. The velocity vector calculating unit calculates the velocity vector of the haulage vehicle. The position calculating unit calculates a position of the haulage vehicle by using the velocity vector.

4 Claims, 11 Drawing Sheets

(56) References Cited

U.S. PATENT DOCUMENTS

| | | | | |
|---|---|---|---|---|
| 6,421,622 B1* | 7/2002 | Horton | ............... | G01C 21/16 |
| | | | | 701/11 |
| 6,895,313 B2 | 5/2005 | Imada et al. | | |
| 6,959,240 B2 | 10/2005 | Okamoto | | |
| 2004/0064234 A1* | 4/2004 | Okamoto | ............... | G01C 25/00 |
| | | | | 701/70 |
| 2004/0204798 A1* | 10/2004 | Imada | ............... | B60T 8/172 |
| | | | | 701/1 |
| 2005/0021270 A1* | 1/2005 | Hong | ............... | G01P 7/00 |
| | | | | 702/96 |
| 2006/0080033 A1* | 4/2006 | Komatsu | ............... | G01C 21/30 |
| | | | | 701/448 |
| 2009/0018772 A1* | 1/2009 | Watanabe | ............... | G01C 21/165 |
| | | | | 701/472 |
| 2012/0022780 A1* | 1/2012 | Kulik | ............... | G01C 21/28 |
| | | | | 701/498 |
| 2013/0079949 A1* | 3/2013 | Friend | ............... | B60W 40/076 |
| | | | | 701/1 |
| 2015/0032373 A1* | 1/2015 | Ikari | ............... | E01C 23/01 |
| | | | | 701/517 |
| 2015/0088455 A1* | 3/2015 | Yamashita | ............... | G01C 9/08 |
| | | | | 702/155 |

* cited by examiner

FIG. 4A

| | | |
|---|---|---|
| 401 | LINK ID | ID THAT UNIQUELY DETERMINES A LINK |
| 402 | START NODE | START POINT COORDINATES OF THE LINK (NODE ID) |
| 403 | END NODE | END POINT COORDINATES OF THE LINK (NODE ID) |
| 404 | CONNECTION ID TO LINK START POINT | LINK ID TO BE CONNECTED TO THE START NODE |
| 405 | CONNECTION ID TO LINK END POINT | LINK ID TO BE CONNECTED TO THE END NODE |
| | ... | |

FIG. 4B

| NODE ID (406) | COORDINATES OF NODE (407) | ATTRIBUTE (408) |
|---|---|---|
| 1 | X1,Y1,Z1 | - |
| 2 | X2,Y2,Z2 | DUMPING |
| 3 | X3,Y3,Z3 | - |
| 4 | X4,Y4,Z4 | LOADING |
| 5 | X5,Y5,Z5 | - |
| ... | ... | ... |

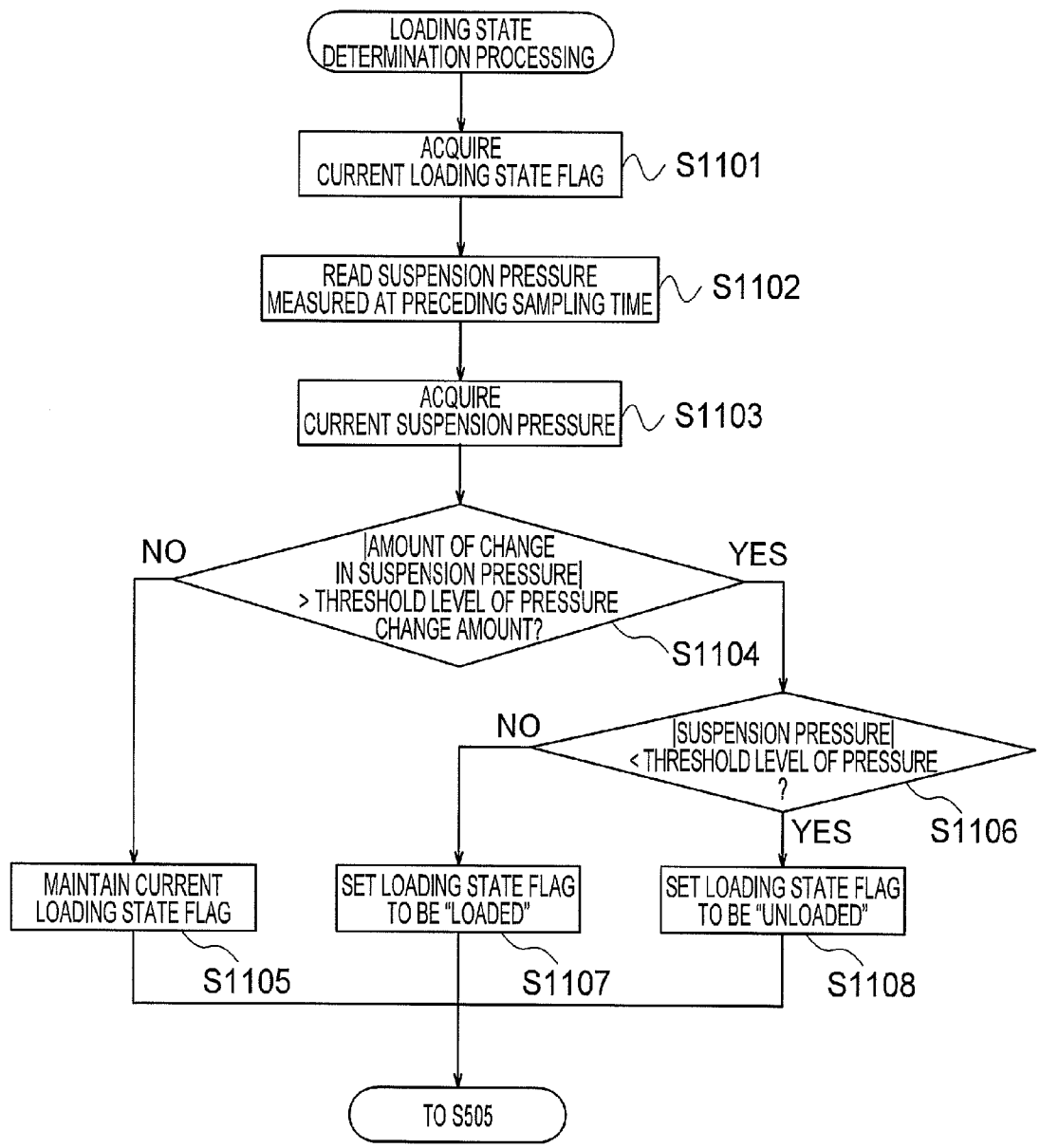

POSITION CALCULATING SYSTEM AND HAULAGE VEHICLE

CROSS-REFERENCE TO RELATED APPLICATION

This application claims the priority of Japanese Patent Application 2014-180456 filed Sep. 4, 2014, which is incorporated herein by reference.

BACKGROUND OF THE INVENTION

1. Field of the Invention

This invention relates to a position calculating system and a haulage vehicle, and especially to improvements in or relating to the accuracy of a position calculation upon calculation of the position of a mining dump truck by dead reckoning that uses an inertial measurement unit (IMU).

2. Description of the Related Art

As a technology for the calculation of the position of a vehicle, there is employed a technology that like a GPS (Global Positioning System) or the like, measures its real coordinates on the earth. For this position calculation by the GPS or the like, the reception of positioning radio waves transmitted from geolocation satellites is indispensable.

However, the positioning radio waves may be blocked by a structural object or the like in the periphery of a travel route so that the position calculation by the GPS may be interrupted. As a technique for interpolating such a GPS position calculation, dead reckoning has hence been proposed. According to this technique, the state of motion of a vehicle is represented as a velocity vector on the earth or a local coordinate system by using a velocity calculated from a wheel rotational speed and outputs from an inertial measurement unit (IMU) including a gyro sensor and acceleration sensor, and the velocity vector is integrated to update the position of the vehicle.

In this dead reckoning, output values from an acceleration sensor and angular velocity sensor, which are disposed on a vehicle, are used so that the accuracies of these output values affect the accuracy of a position calculation. In U.S. Pat. No. 6,959,240 B2 and U.S. Pat. No. 6,895,313 B2, for example, technique are, therefore, proposed that detect an inclination of a vehicle by an acceleration sensor or the like and use this inclination to correct output values of the acceleration sensor and a gyro sensor.

SUMMARY OF THE INVENTION

These days, large dump trucks (hereinafter simply called "dump trucks" for the sake of brevity) are used as haulage vehicles for mines. A mining dump truck is configured with a body frame, which includes a body, being mounted on front, rear, left and right wheels via suspensions, and travels carrying a heavy load such as ore or rock on the body. If the weight balance of the load carried on the body is disproportionate, the expansion/contraction amount of each suspension changes independently, and therefore the body frame may incline relative to the wheels depending on the loading state that the load is carried.

If an inertial measurement unit is mounted on the body frame of the mining dump truck and dead reckoning is applied for the calculation of the position of the mining dump truck in the above-described situation, a problem arises that an inclination of the body frame affects outputs from a gyro sensor and acceleration sensor and the effects of this inclination lead to a reduction in the accuracy of the position calculation.

However, the techniques described in U.S. Pat. No. 6,959,240 B2 and U.S. Pat. No. 6,895,313 B2 cannot solve the above-described problem, because they are correction techniques in which the inclination of a body frame in a loaded state is not taken into consideration.

With the foregoing in view, the present invention has as objects thereof the provision of a position calculating system and haulage vehicle that can calculate the position of a vehicle or the vehicle with high accuracy even when an inclination has occurred on its body frame in a loaded state.

To solve the above-described problem, the present invention provides, in one aspect thereof, a position calculating system for being mounted on a haulage vehicle including wheels and a body frame which is mounted on the wheels via suspensions and carries a body mounted thereon. The position calculating system includes an attitude detection sensor configured to output attitude information indicating an attitude of the body frame relative to the wheels; a wheel rotational speed sensor that outputs a rotational speed of one of the wheels; a loading status information acquiring unit configured to acquire loading status information on the body frame, said information indicating whether the body frame is in a loaded state with a load carried thereon or in an unloaded state with the load not carried thereon; a correction amount setting unit that calculates, based on the attitude information, a correction amount required for bringing detection axes, which are to be used upon outputting the attitude information in the loaded state, into coincidence with corresponding detection axes, which are to be used upon outputting the attitude information in the unloaded state, and that sets the correction amount as a correction amount for use in calculating a velocity vector of the haulage vehicle in the loaded state; a velocity vector calculating unit that determines, based on the loading status information, whether the body frame is in the loaded state or the unloaded state and that, when the body frame has been determined to be in the loaded state, calculates the velocity vector of the haulage vehicle by using a wheel speed available from the rotational speed of the one wheel, a direction of motion of the haulage vehicle as determined from the attitude information, and the set correction amount; and a position calculating unit that calculates a position of the haulage vehicle by using the velocity vector.

Owing to the above-described configuration, by performing a correction to the direction of motion of the haulage vehicle, which has been determined from attitude information outputted with the body frame being in an inclined state relative to the wheels because of a load carried thereon, while using a correction amount required to bring the detection axes in the loaded state into coincidence with the corresponding detection axes in an unloaded state, a velocity vector based on the direction of motion, from which effects of the inclination have been eliminated, and also on the wheel rotational speed can be calculated. Therefore, the position calculated based on this velocity vector is free from the effects of the inclination of the vehicle, so that the accuracy of the calculation of the position of the haulage vehicle can be also assured to be high even in the loaded state.

In the above-described configuration, it may be preferred that, when the vehicle is determined to be in the unloaded state based on the loading status information, the correction amount setting unit deletes the calculated correction amount and sets another correction amount expressed in terms of an identity matrix.

In the unloaded state, the body frame is not inclined relative to the wheels, and therefore the effects of an inclination of the body frame are not included in the direction of motion of the haulage vehicle as determined from the attitude information. In the unloaded state, the correction amount for use in correcting the inclination of the body frame is thus deleted, and the identity matrix is applied as a correction amount to calculate a velocity vector in the same direction as the direction of motion as calculated in the unloaded state. The calculation of the position of the haulage vehicle can then be performed using the velocity vector and applying the same processing as in the position calculating process in the loaded state.

In the above-described configuration, it may be preferred that the position calculating system further includes a correction amount storage unit that stores the correction amount calculated beforehand, and that, when the body frame is determined to be in the loaded state based on the loading status information, the correction amount setting unit, instead of the calculation of the correction amount, reads the correction amount from the correction amount storage unit and sets the same.

This configuration can reduce the processing load on the position calculating system compared to the case that a correction amount is calculated whenever determined to be in a loaded state.

In the above-described configuration, it may be preferred that the position calculating system further includes a map information storage unit that stores map information indicating a travel route which connects a loading point where the load is loaded and an dumping point where the load is dumped, and that, based on whether the loading point or the dumping point has been reached based on the position of the haulage vehicle as calculated by the position calculating unit and the map information, the loading status information acquiring unit determines whether the body frame is in the loaded state or in the unloaded state, and generates the loading status information that indicates a result of the determination.

This configuration can determine that the body frame is in an unloaded state when the position of the haulage vehicle as calculated by the position calculating unit is moving toward the loading point, and that the body frame is in a loaded state when the position of the haulage vehicle as calculated by the position calculating unit is moving toward the dumping point.

In the above-described configuration, it may be preferred that the loading status information acquiring unit compares an output from a suspension pressure sensor, which detects a pressure of one of the suspensions provided in the haulage vehicle, with a threshold level of suspension pressure for use in distinguishing the unloaded state or the loaded state, and based on a result of the comparison, generates the loading status information.

As the pressure of each suspension differs between an unloaded state and a loaded state, this configuration can determine, by using whether the pressures of the suspensions are the same or different, whether the body frame is in the loaded state or in the unloaded state.

The present invention also provides, in another aspect thereof, a haulage vehicle including wheels and a body frame which is mounted on the wheels via suspensions and carries a body mounted thereon. The haulage vehicle includes an attitude detection sensor configured to output attitude information indicating an attitude of the body frame relative to the wheels, a wheel rotational speed sensor that outputs a rotational speed of one of the wheels, a loading status information acquiring unit configured to acquire loading status information on the body frame, said information indicating whether the body frame is in a loaded state with a load carried thereon or in an unloaded state with the load not carried thereon, a correction amount setting unit that calculates, based on the attitude information, a correction amount required for bringing detection axes, which are to be used upon outputting the attitude information in the loaded state, into coincidence with corresponding detection axes, which are to be used upon outputting the attitude information in the unloaded state, and that sets the correction amount as a correction amount for use in calculating a velocity vector of the haulage vehicle in the loaded state, a velocity vector calculating unit that determines, based on the loading status information, whether the body frame is in the loaded state or the unloaded state and that, when the body frame has been determined to be in the loaded state, calculates the velocity vector of the haulage vehicle by using a wheel speed available from the rotational speed of the one wheel, a direction of motion of the haulage vehicle as determined from the attitude information, and the set correction amount, and a position calculating unit that calculates a position of the haulage vehicle by using the velocity vector.

Owing to the above-described configuration, by performing a correction to the direction of motion of the haulage vehicle, which has been determined from attitude information outputted with the body frame being in an inclined state relative to the wheels because of a load carried thereon, while using a correction amount required to bring the detection axes in the loaded state into coincidence with the corresponding detection axes in an unloaded state, a velocity vector based on the direction of motion, from which effects of the inclination have been eliminated, and also on the wheel rotational speed can be calculated. Therefore, the position calculated based on this velocity vector is free from the effects of the inclination of the vehicle, so that the accuracy of the calculation of the position of the haulage vehicle can be also assured to be high even in the loaded state.

The present invention can provide a position calculating system and a haulage vehicle, which enable a high-accuracy position calculation even if an inclination has occurred on a body frame in a loaded state. Problems, configurations and advantageous effects other than those described above will become apparent from the following description of embodiments.

BRIEF DESCRIPTION OF THE DRAWINGS

FIGS. 2A and 2B are diagrams illustrating the attitudes of a body frame in an unloaded state and a loaded state, in which FIG. 2A illustrates the unloaded state and FIG. 2B illustrates the loaded state.

FIGS. 4A and 4B are diagrams illustrating one example of an access map in the first embodiment, in which FIG. 4A illustrates link information and FIG. 4B illustrates node information.

FIG. 11 is a flow chart showing the flow of loading state determination processing in the first embodiment of the second aspect.

DETAILED DESCRIPTION OF PREFERRED EMBODIMENTS

With reference to the accompanying drawings, a description will hereinafter be made about embodiments of the first and second aspects of the present invention. In the following embodiments, they will be described by dividing them into plural sections or combining them as plural embodiments whenever needed for the sake of convenience. When the numbers of elements and the like (including the numbers of parts or components, numerical values, amounts, ranges, and so on) are referred to in the following embodiments, they shall not be limited to any specific numbers and may be not smaller or not greater than specific numbers unless specifically indicated or unless apparently limited to specific numbers in principle. In the following embodiments, their constituent elements (including processing steps and the like) are not absolutely essential unless specifically indicated or unless clearly considered to be essential in principle.

Further, the individual configurations, functions, processing units, processing means and the like in the following embodiments may be partly or wholly realized, for example, as integrated circuits or other hardware. Alternatively, the below-described individual configurations, functions, processing units, processing means and the like may be realized as programs to be executed on a computer, in other words, may be realized as software. Information on programs, tables, files and the like, which realize the individual configurations, functions, processing units, processing means and the like, can be stored in storage devices.

Throughout the entire drawings that illustrate the embodiments, members having the same functions are identified by the same or related designations, and their repeated descriptions will be omitted. It is also to be noted that in the following embodiments, the description of the same or similar parts will not be repeated as a general rule unless specifically needed.

First Embodiment of First Aspect

Figure 1:
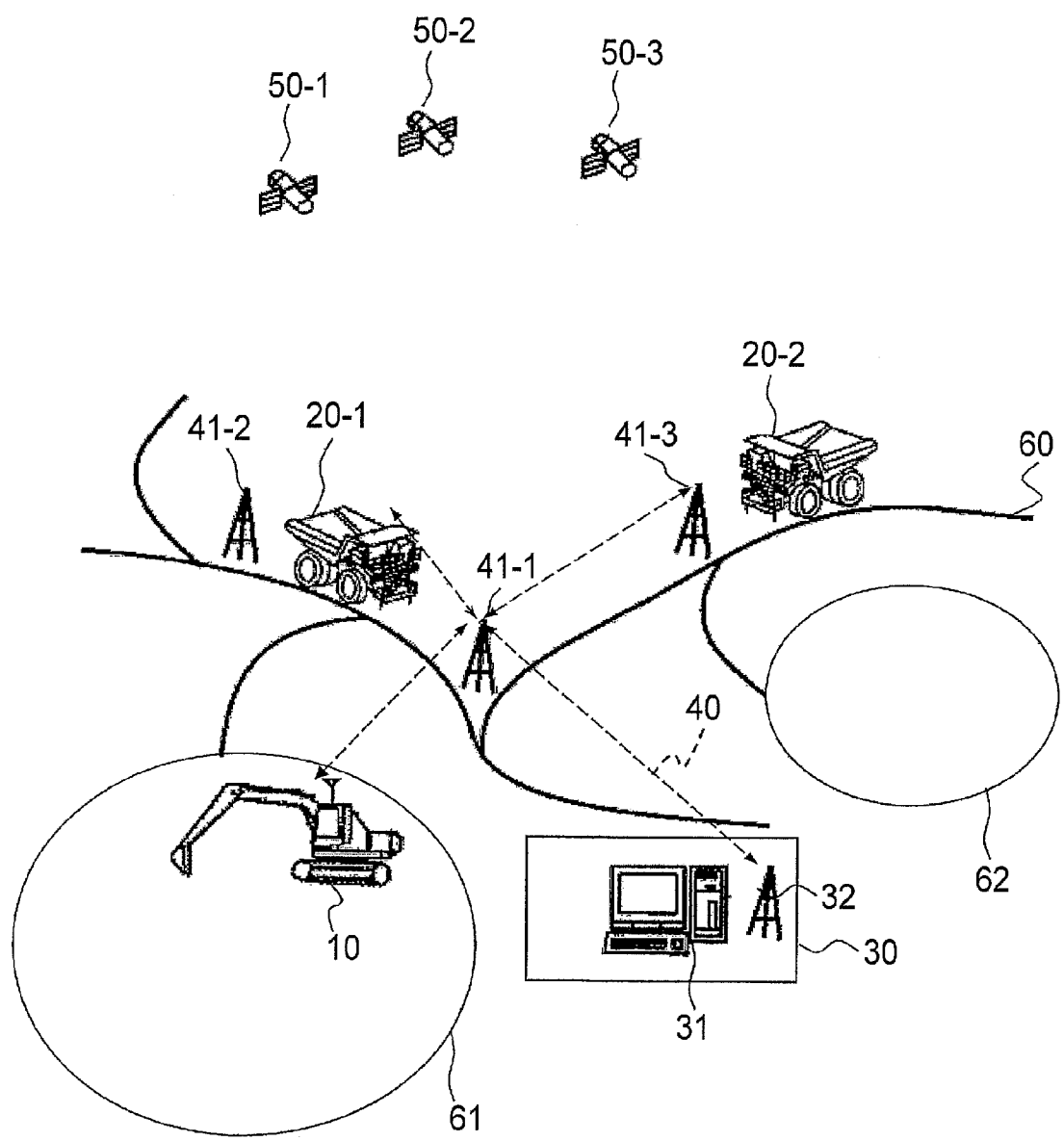
FIG. 1 is a diagram illustrating the schematic layout in a mine.

Referring to FIG. 1, a description will be made about the schematic layout in a mine where mining dump trucks (hereinafter simply called "dump trucks" for the sake of brevity) as haulage vehicles, on each of which a position calculating system according to this embodiment is mounted, travel. FIG. 1 is a diagram illustrating the schematic layout in the mine.

As illustrated in FIG. 1, a travel route 60 is provided in the mine, and connects a loading site 61 (which is equivalent to a loading point) and a dumping site 62 (which is equivalent to a dumping point). At the loading site 61, an excavator 10, which performs loading work of rock or ore, carries out digging work. Dump trucks 20-1, 20-2 are each loaded into a loaded state with a load such as rock or ore by the excavator 10 at the loading site 61, and in this loaded state, travel toward the dumping site 62 along the travel route 60. When the dump trucks 20-1, 20-2 reach the dumping site 62, the load is dumped out so that the dump trucks 20-1, 20-2 are brought into an unloaded state. In this unloaded state, the dump trucks 20-1, 20-2 then travel toward the loading site 61.

When the dump trucks 20-1, 20-2 are unmanned dump trucks that perform autonomous traveling without any operator on board, the dump trucks 20-1, 20-2 are each connected to a vehicle control server 31, which is installed at a control center 30, via wireless communication lines 40 for communications therebetween. The dump trucks 20-1, 20-2, therefore, travel according to traffic control from the vehicle control server 31. In FIG. 1, numeral 32 indicates a radio antenna to be connected to the vehicle control server 31, while numerals 41-1, 41-2, 41-3 designate wireless mobile station's.

When the dump trucks 20-1, 20-2 are manned dump trucks that travel according to steering by an operator on board, such traffic control by the vehicle control server 31 is not essential, but traveling may be performed under traffic control to assure higher safety. In the description that will follow, the dump trucks 20-1, 20-2 will be referred to simply as "the dump truck or trucks 20" where no distinction is needed between them.

The dump truck 20 is provided with a position calculating system (the illustration of which is omitted in FIG. 1) for receiving positioning radio waves from at least three geolocation satellites 50-1, 50-2, 50-3 in a Global Positioning System (GPS) to acquire the position of the own vehicle.

Figure 2A:
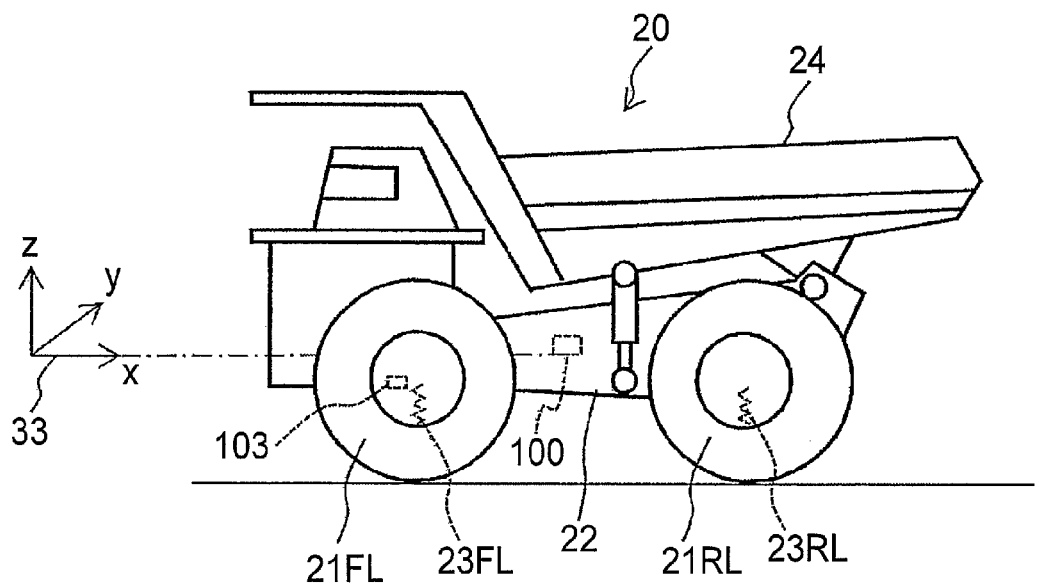
Figure 2B:
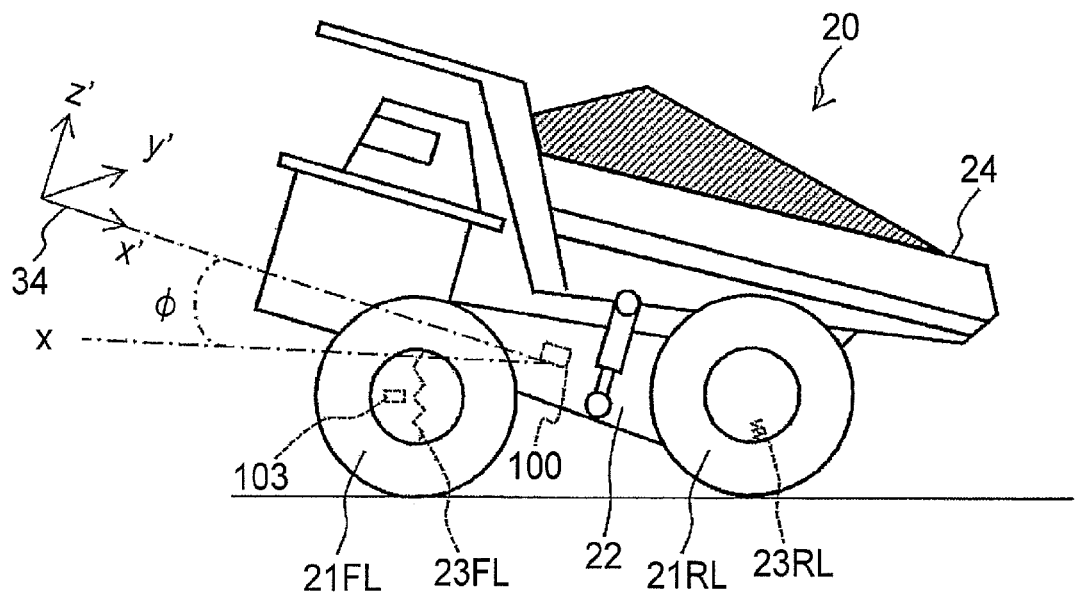

In addition, the position calculating system according to this embodiment for the dump truck 20 makes combined use of dead reckoning to interpolate DNSS data so that the accuracy of the position calculation can be improved. This embodiment features the configuration that reduces the effects of a body frame attitude upon position calculation by dead reckoning. With reference to FIGS. 2A and 2B, a description will hereinafter be made about attitudes of a body frame in an unloaded state and a loaded state. FIGS. 2A and 2B are diagrams illustrating the attitudes of the body frame in the unloaded state and loaded state, in which FIG. 2A illustrates the unloaded state and FIG. 2B illustrates the loaded state.

As illustrated in FIGS. 2A and 2B, the dump truck 20 includes wheels and a body frame 22 mounted on the wheels. Between the wheels and body frame (which may also be called "the frame") 22, suspensions are disposed. For the convenience of explanation, only a front left wheel 21FL and a rear left wheel 21RL and a front left suspension 23FL and a rear left suspension 23RL, which connect the front left wheel 21FL and rear left wheel 21RL to the body frame 22, respectively, are illustrated in FIGS. 2A and 2B, although the dump truck 20 also includes a front right wheel and a rear right wheel and a front right suspension and a rear right suspension, which connect the front right wheel and rear right wheel and the body frame, respectively. In the following description, the front and rear, left and right wheels and suspensions will be referred to simply as "the wheels 21 and suspensions 23" when they are collectively called.

Mounted on the body frame 22 is a body 24 on which a load is carried. In the following description, all the constituent elements of the dump truck 20, including the wheels 21, will be called "the vehicle".

Also mounted on the body frame 22 is an inertial measurement unit (IMU) 100, which detects angles (or angular velocities) of and accelerations along three axes that govern motion (hereinafter called "the detection axes"). The IMU 100 includes an acceleration sensor 101 and a gyro sensor 102 (see FIG. 3). The acceleration sensor 102 measures accelerations which are applied to the body frame 22 and include an acceleration in the gravity direction, and the gyro sensor 102 measures rotation angular velocities of the body frame 22. These acceleration sensor 101 and gyro sensor 102 are provided around the center of gravity of the body frame 22. In the following description, outputs (accelerations) from the acceleration sensor 101 and outputs (angular velocities) from the gyro sensor 102 will be collectively called "IMU output values". The IMU corresponds to the attitude detection sensor, and the IMU output values correspond to attitude information.

To the front left wheel 21FL, a wheel rotational speed sensor 103 that measures the rotational speed of the wheel is attached.

As illustrated in FIG. 2A, the body frame 22 has no inclination relative to the wheels 21 in the unloaded state, and detection axes (x-axis, y-axis and z-axis) 33 of the acceleration sensor 101 and gyro sensor 102 attached to the body frame 22 are in coincidence with the longitudinal axis and lateral axis of motion of the vehicle and the axis, which extends perpendicular to a plane with the longitudinal axis and lateral axis contained therein, respectively. The detection axes 33 are hence those which are to be used upon outputting attitude information in the unloaded state.

In the loaded state, on the other hand, the weight of the load carried on the body 24 is not applied evenly to the body frame 22 as illustrated in FIG. 2B, so that the weight balance may become disproportionate in the front-rear and left-right directions of the body frame 22. If such a weight imbalance arises, the four suspensions 23 expand or contract independently each other to perform an adjustment to the body frame balance. As a result, the body frame 22 inclines relative to the wheels 21. Defining a horizontal plane, which perpendicularly intersects the gravity direction, as a horizontal plane, the angle between the horizontal plane and the longitudinal axis of the vehicle and the angle between the horizontal plane and the lateral axis of the vehicle will hereinafter be defined as a pitch angle $\Phi$ and a roll angle $\phi$, respectively. FIG. 2B illustrates a so-called "more rear mass state" that more weight is applied to a rear section than to a front section of the body frame 22. In this case, the rear left suspension 23RL and rear right suspension (not shown) contract while the front left suspension 23FL and front right suspension (not shown) expand. As a result, the body frame 22 inclines over the pitch angle $\Phi$ relative to the x-axis (see FIG. 2A) so that the x-axis is transformed to an x'-axis.

When the body frame 22 inclines over the roll angle $\phi$ relative to the y-axis (see FIG. 2A), on the other hand, the y-axis is transformed to a y'-axis. A z'-axis is an axis that perpendicularly intersects the two axes of the x'-axis and y'-axis, and indicates an axis to which the z-axis has been transformed. Detection axes 34 in such a loaded state are those which are to be used upon outputting attitude/information in the loaded state, and are inclined over the pitch angle $\Phi$ and roll angle $\phi$ relative to detection axes 33 in the unloaded state.

Figure 3:
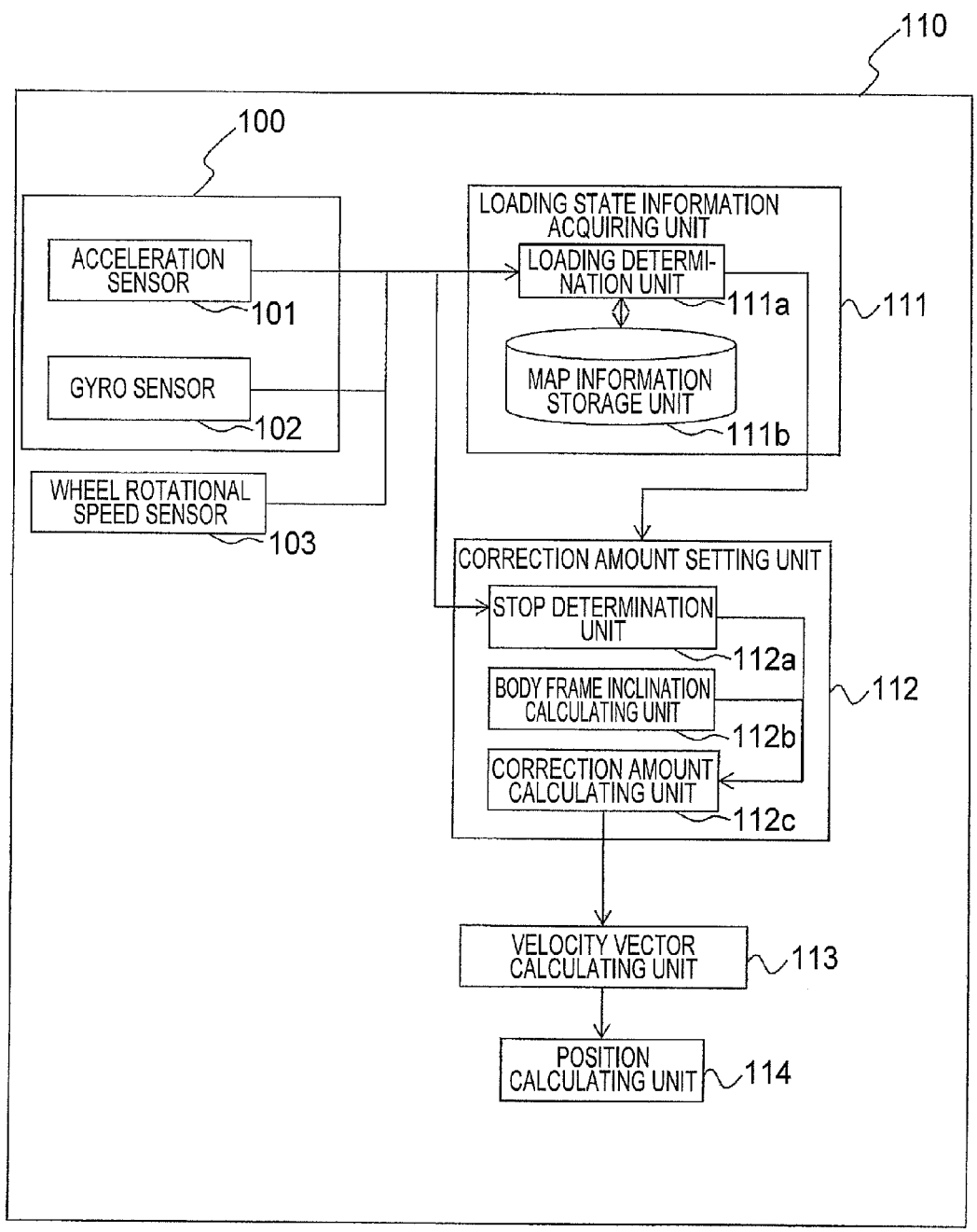
FIG. 3 is a functional block diagram depicting the internal configuration of a position calculating system according to a first embodiment of the first aspect of the present invention.

This embodiment is provided with the position calculating system that eliminates the effects of an inclination of the body frame from the detection axes 34, said effects being indicated by IMU output values, to calculate a velocity vector which indicates actual motion of the dump truck 20. With reference to FIG. 3, a description will hereinafter be made about the internal configuration of the position calculating system. FIG. 3 is a functional block diagram depicting the internal configuration of the position calculating system.

As depicted in FIG. 3, the position calculating system 110 includes the IMU 100, the wheel rotational speed sensor 103, a loading status information acquiring unit 111, a correction amount setting unit 112, a velocity vector calculating unit 113, and a position calculating unit 114. The IMU 100 includes the acceleration sensor 101 and gyro sensor 102. The wheel rotational speed sensor 103 measures the rotational speed of the front left wheel 21FL. The loading status information acquiring unit 111 generates or acquires loading status information that indicates whether the body frame 22 is in a loaded state or unloaded state. The correction amount setting unit 112 calculates, based on IMU output values, a correction amount required for bringing the detection axes of a body frame attitude in the loaded state into coincidence with the corresponding detection axes of a body frame attitude in the unloaded state, and sets the correction amount as a correction amount for use in calculating a velocity vector of the own vehicle in the loaded state. The velocity vector calculating unit 113 determines, based on the loading status information, whether the body frame 22 is in the loaded state or the unloaded state and, when the body frame is determined to be in the loaded state, calculates the velocity vector of the dump truck 20 by using a wheel speed available from the rotational speed of the front left wheel 21FL, the direction of motion of the dump truck 20 as determined from the output value of the gyro sensor 102, and the set correction amount. The position calculating unit 114 calculates the position of the dump truck 20 by using the velocity vector.

In the first embodiment, the loading status information acquiring unit 111 includes a loading determination unit 111a and a map information storage unit 111b. The loading determination unit 111a determines the loaded state or the unloaded state by using the IMU output values, and the map information storage unit 111b stores map information (access map) that indicates a travel route connecting the loading point where a load is loaded and the dumping point where the load is dumped. The access map is a topological map that represents, with points (hereinafter referred to as "nodes") and lines (hereinafter referred to as "links"), the connection of pathways to points where the loading state of the vehicle changes to the loaded state and the unloaded state, respectively (the loading point and unloading point).

Further, the correction amount setting unit 112 includes a stop determination unit 112a, a body frame inclination calculating unit 112b and a correction amount calculating unit 112c. The stop determination unit 112a determines whether the dump truck 20 is at stop or moving. Using IMU output values, the body frame inclination calculating unit 112b calculates inclination angles of the body frame 22 as needed when the attitude of the body frame in the unloaded state is taken as a standard. The correction amount calculating unit 112c successively calculates a correction amount required for correcting the amount of a change in the inclination of the body frame due to a change in carried load. It is to be noted that a unit, which receives positioning radio waves from the GPS and calculates the position, may also be included in the position calculating system 110 and may be used in combination with the calculation of the position by the dead reckoning in this embodiment to determine the final position of the dump truck 20, although the depiction of such a GPS unit is omitted in the figure.

Referring to FIGS. 4A and 4B, a description will be made about a configuration example of the access map. FIGS. 4A and 4B are diagrams illustrating one example of the access map, in which FIG. 4A illustrates link information and FIG. 4B illustrates node information.

The access map is represented by nodes, through which the vehicle should pass en route to the loading point or unloading point, and links which indicate the connection of the nodes. As illustrated in FIG. 4A, the access map includes a table that specifies a link ID 401, a node ID 402, a node ID 403, another link ID 404, and a further link ID 405. The link ID 401 identifies one of the links. The node ID 402 identifies the node located at the coordinates where the link starts. The node ID 403 indicates the node located at the coordinates where the link ends. The another link ID 404 identifies another link connected to the link start point. The further link ID 405 identifies a further link connected to the link end point. As the another link ID 404, plural links may exist. As the further link ID 405, plural links may also exist. As illustrated in FIG. 4B, the access map also includes a table of coordinate values 407, which correspond to node IDs 406, and attributes 408 of the coordinate values. In the attributes 408, one of these node IDs is set as the loading point and one of the remaining node IDs is set at the dumping point.

Figure 5:
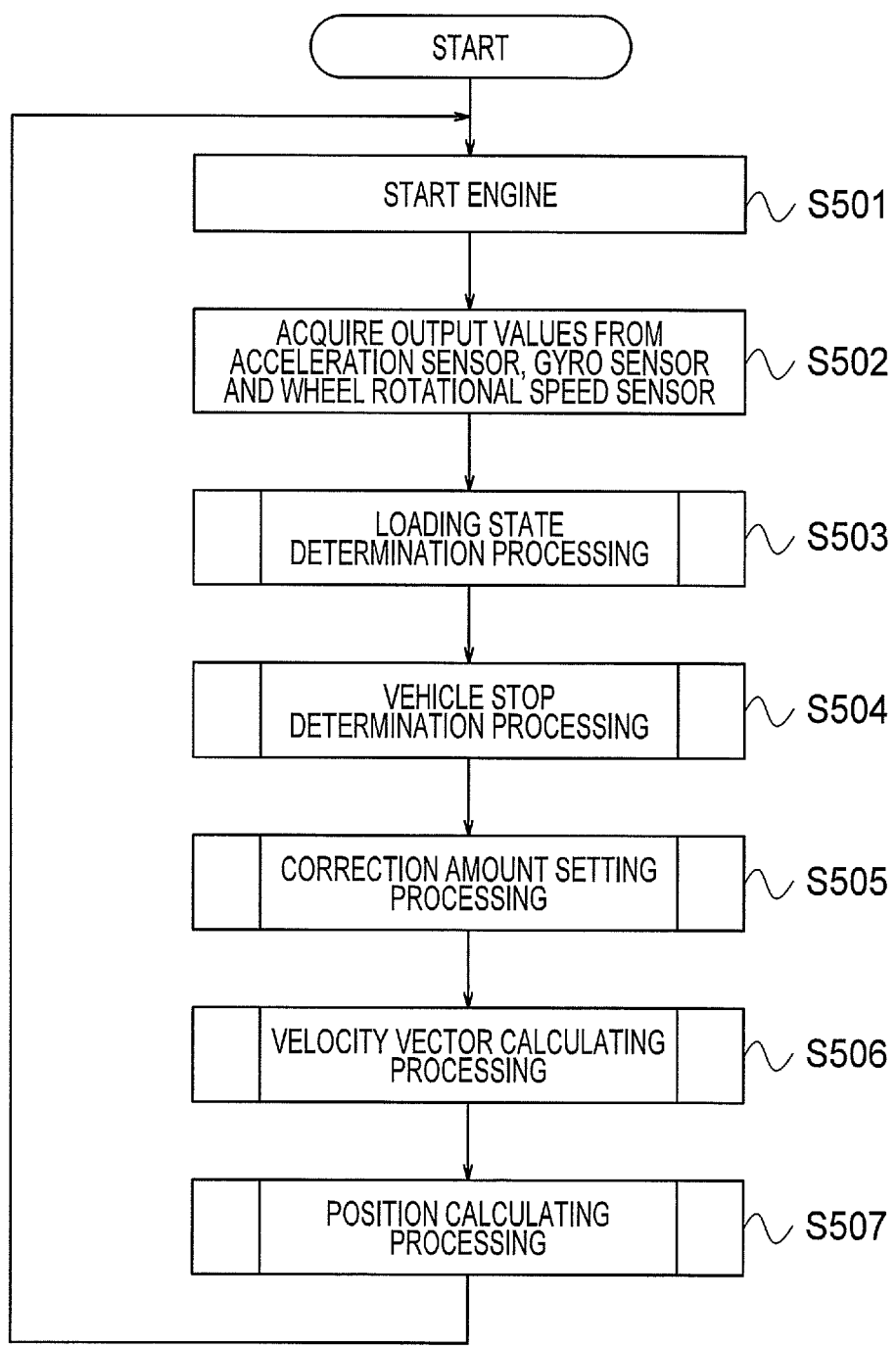
FIG. 5 is a flow chart showing the entire flow of position calculation processing in the first embodiment.

Referring next to FIG. 5, a description will be made about the outline of position calculation processing in the first embodiment. FIG. 5 is a flow chart showing the entire flow of the position calculation processing.

The description will hereinafter be made along and in the order of the individual steps in FIG. 5. It should, however, be assumed that upon starting the position calculation processing, the initial position of the dump truck 20 has been given. When the engine of the dump truck 20 is started in this state (S501), the acceleration sensor 101, gyro sensor 102 and wheel rotational speed sensor 103 output the gravity-including acceleration and rotation angular velocity of the body frame and the rotational speed of the front left wheel 21FL at predetermined intervals (S502). The outputs from the respective sensors are continuously made until the engine stops.

The loading determination unit 111*a* acquires the output values of the sensors, and performs loading state determination processing to determine whether or not any change has taken place in loading state and, if there is a change, whether the change is from an unloaded state to a loaded state or from a loaded state to an unloaded state (S503).

The stop determination unit 112*a* next performs vehicle stop determination processing to determine whether the dump truck 20 is moving or at stop (S504).

Depending on the result of the determination of moving or at stop by the stop determination unit 112*a*, the existence or non-existence of a change in loading state and, if there is the change in loading state; the details of the change in loading state, the correction amount setting unit 112 performs correction amount setting processing to calculate a velocity vector (S505). If there is a need to calculate a new correction amount upon setting the correction amount, the body frame inclination calculating unit 112*b* calculates inclination angles of the body frame by using the acceleration and rotation angular velocity outputted from the acceleration sensor 101 and gyro sensor 102, and by using these inclination angles of the body frame, the correction amount calculating unit 112*c* calculates and sets the new correction amount.

Using the correction amount set in step S505, the velocity vector calculating unit 113 calculates the velocity vector of the vehicle (S506).

Using the velocity vector so calculated, the position calculating unit 114 performs position calculation processing (S507). Subsequently, until the engine stops, the flow returns to step S501, and the processing of the steps S501 to S507 is repeated.

Figure 6:
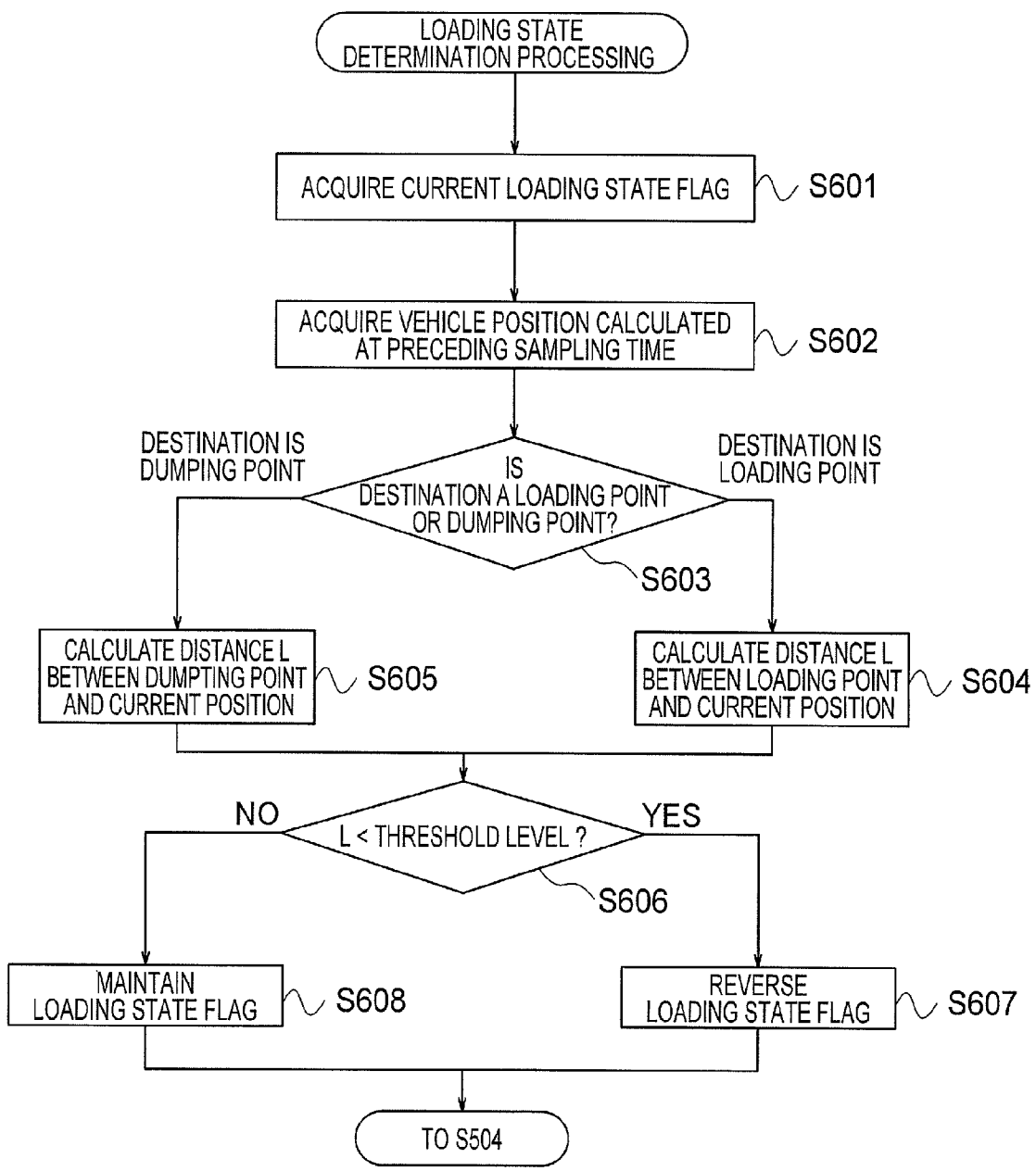
FIG. 6 is a flow chart showing the flow of loading state determination processing in the first embodiment.

With reference to FIG. 6, a description will be made about the loading state determination processing. FIG. 6 is a flow chart showing the flow of the loading state determination processing in the first embodiment.

As shown in FIG. 6, the loading determination unit 111*a* acquires a current loading state flag (S601). As the loading state flag, 1 is assumed to indicate a loaded state, while 0 is assumed to indicate an unloaded state.

The loading determination unit 111*a* next acquires the position of the vehicle as calculated at the preceding sampling time, and sets it as a current position (S602). This current position is used in the calculation of a distance L to a destination.

The loading determination unit 111*a* finds a final reach point of a route, along which the dump truck 20 is currently traveling, from the access map stored in the map information storage unit 111*b*, and determines whether the destination is a loading point or a dumping point. If the destination is the loading point (S603/destination is loading point), the distance L from the previously-calculated position (the initial position in the case of the first position calculation processing) to the destination, in other words, to the loading point in the access map is calculated (S604). If the destination is the dumping point, on the other hand (S603/destination is dumping point), the distance L between the dumping point and the current position is calculated (S605).

After completion of the calculation of the distance L, the loading determination unit 111*a* compares the distance L with a threshold level of distance as defined by a distance at which the destination is considered to have been reached (S606). If the loading determination unit 111*a* determines that the distance L is smaller than the threshold level of distance (S606/YES), the carried load is assumed to change from now, and the loading state flag is reversed opposite to the value acquired in step S601, specifically can be set at 0 if the value of the current loading state flag is 1 or at 1 if the value of the current loading state flag is 0, (S607). If the distance L is equal to or greater than the threshold level of distance (S606/NO), no change is assumed to have taken place in the carried load and the value of the loading state flag as obtained in step S701 is maintained (S608). When the loading state flag has been set, the loading state determination processing by the loading determination unit 111*a* is completed.

Figure 7:
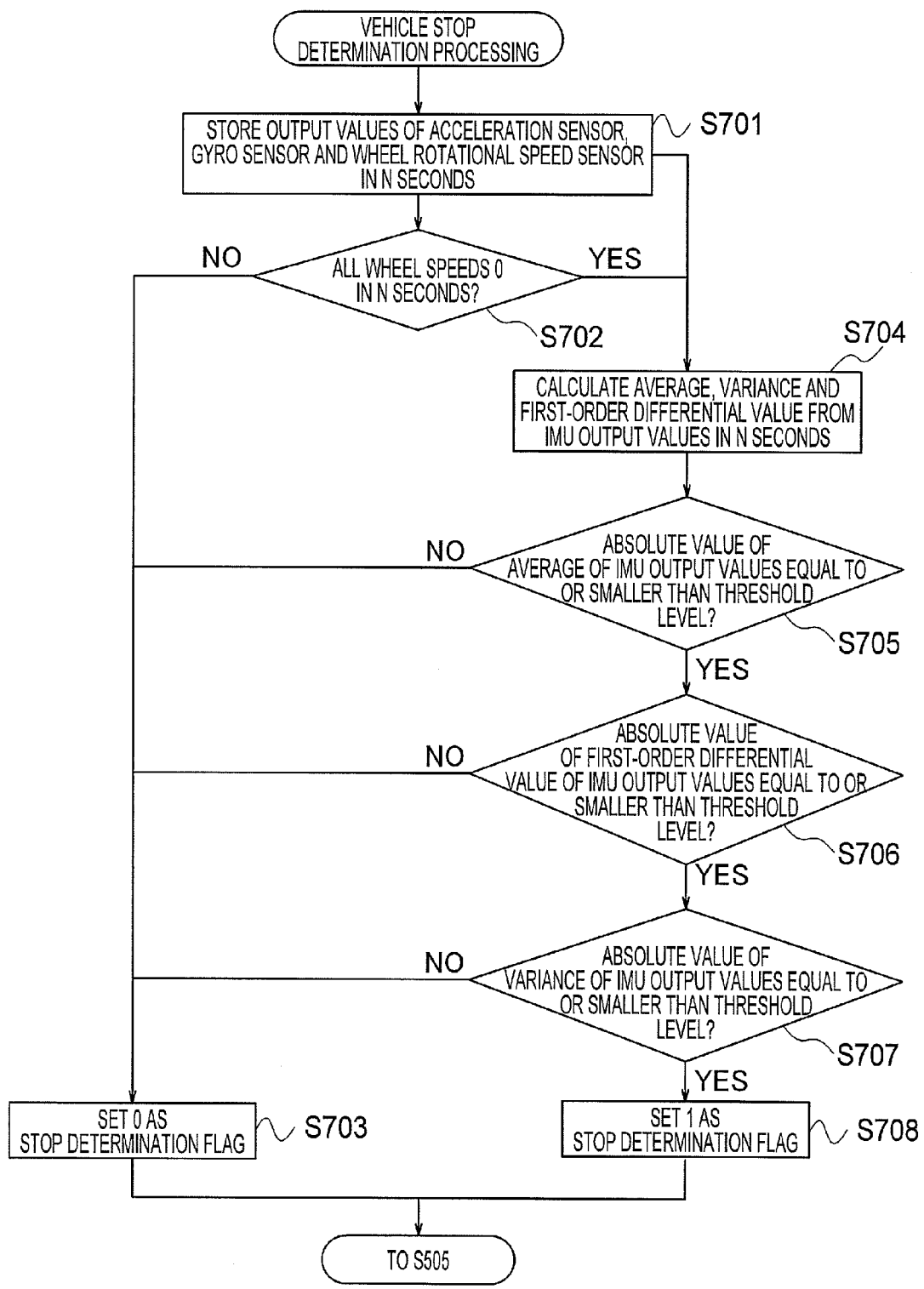
FIG. 7 is a flow chart showing the flow of vehicle stop determination processing in the first embodiment.

Referring next to FIG. 7, a description will be made about the vehicle stop determination processing. FIG. 7 is a flow chart showing the flow of the vehicle stop determination processing.

As shown in FIG. 7, upon acquisition of the output values from the respective sensors in step S502, the stop determination unit 112*a* stores the output values of the acceleration sensor 101, gyro sensor 102 and wheel rotational speed sensor 103 in N seconds, including the output values of the current sampling as inputted, in an internal memory (S701).

The stop determination unit 112*a* then determines whether or not the output values of the wheel rotational speed in the N seconds are all in a state that no speed has arisen (S702). If any one of the output values of the wheel rotational speed (wheel speeds) is determined to be in a state that a speed has arisen (S702/NO), 0 is set as the stop determination flag (S703) and the processing by the stop determination unit 112a is completed.

If the stop determination unit 112a determines that the output values of the wheel rotational speed (wheel speeds) are all in a state that no speed has arisen (S702/YES), the stop determination unit 112a calculates the average and variance of IMU output values in N seconds and an inclination value (first-order differential value) determined by a least squares method from all the sampled data in N seconds (S704).

The stop determination unit 112a determines if the absolute values of the averages of the respective output values of the acceleration sensor 101 and gyro sensor 102 in N seconds are equal to or smaller than a threshold level of acceleration and a threshold level of angular velocity for determining that the vehicle is at stop. If the absolute value of the average of the accelerations is greater than the threshold level of acceleration and the absolute value of the average of the angular velocities is greater than the threshold level of angular velocity (S705/NO), the process is forwarded to step S703, where 0 is set as the stop determination flag and the processing at the stop determination unit 112a is completed. If the stop determination unit 112a determines that the absolute value of the average of the accelerations is equal to or smaller than the threshold level of acceleration and the absolute value of the average of the angular velocity is equal to or smaller than the threshold level of angular velocity (S705/YES), the process is forwarded to step S706.

The stop determination unit 112a determines if the absolute value of the inclination determined by the least squares method from all the respective sampled data of the acceleration sensor 101 and gyro sensor 102 in N seconds is greater than a threshold level of inclination for determining that the vehicle is at stop. If the absolute value of the inclination is determined to be greater than the threshold level of inclination (S706/NO), the process is forwarded to step S703, where 0 is set as the stop determination flag and the processing at the stop determination unit 112a is completed. If the stop determination unit 112a determines that the absolute value of the inclination is equal to or smaller than the threshold level of inclination (S706/YES), the process is forwarded to step S707.

The stop determination unit 112a determines if the absolute values of the variances of the respective output values of the acceleration sensor 101 and gyro sensor 102 in N seconds are equal to or smaller than corresponding threshold levels of variances for determining that the vehicle is at stop. If the absolute values of the variances are determined to be greater than the threshold levels of variances (S707/NO), the process is forwarded to step S703, where 0 is set as the stop determination flag and the processing at the stop determination unit 112a is completed. If the stop determination unit 112a determines that the absolute values of the variances are equal to or smaller than the corresponding threshold levels of variances (S707/YES), on the other hand, 1 is set as the stop determination flag (S708) and the processing at the stop determination unit 112a is completed. It is to be noted that the order of steps S705, S706, S707 may be changed.

Figure 8:
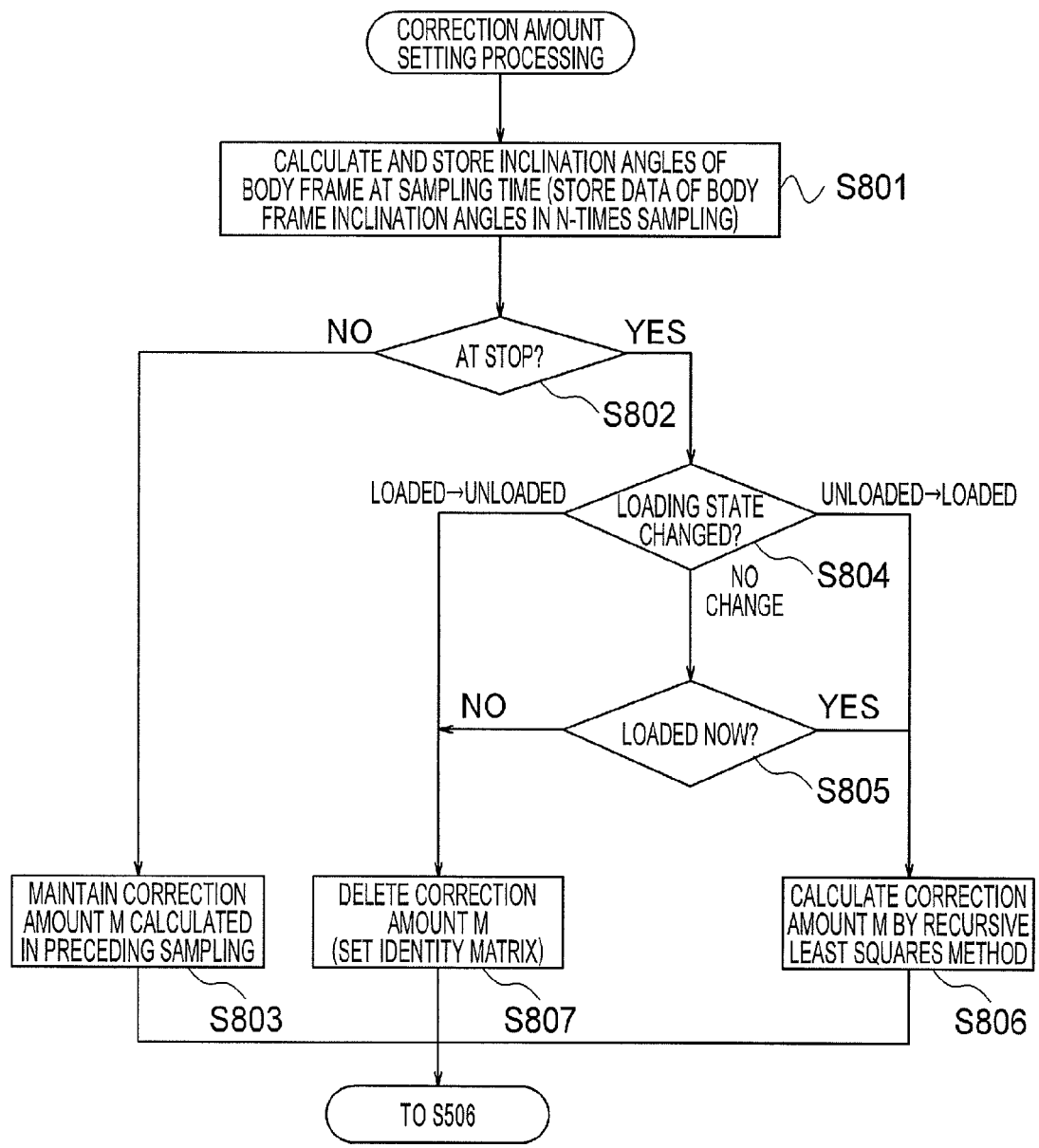
FIG. 8 is a flow chart showing the flow of correction amount setting processing in the first embodiment.

After completion of the vehicle stop determination processing, the process is forwarded to the correction amount setting processing (S505). Referring next to FIG. 8, a description will be made about the correction amount setting processing. FIG. 8 is a flow chart showing the flow of the correction amount setting processing in the first embodiment.

As shown in FIG. 8, the body frame inclination calculating unit 112b calculates the inclination angles (roll angle Φ, pitch angle φ) of the body frame at the time of sampling (S801). The inclination angles of the body frame as calculated at the body frame inclination calculating unit 112b are acquired and stored for a predetermined sampling time that includes the current sampling time. The inclination angles of the body frame can be calculated according to the following formulas (1) and (2).

$$\text{Roll angle } \phi = \arcsin\left[\{(\text{lateral acceleration output value of acceleration sensor}) - (\text{lateral acceleration})/(\text{gravitational acceleration})\}\right] \quad (1)$$

$$\text{Pitch angle } \Phi = \arcsin\left[\{(\text{longitudinal acceleration output value of acceleration sensor}) - (\text{vehicle acceleration})/(\text{gravitational acceleration})\}\right] \quad (2)$$

However, the calculation should be made by using, as both the roll angle φ and pitch angle Φ, the corresponding values at the time of the preceding sampling as they are when the vehicle is determined to be at stop based on the results at the stop determination unit 112a, or by using, as an acceleration, the derivative of a wheel speed calculated from an output of the wheel rotational sensor 103 when the vehicle is determined to be moving. Further, the lateral acceleration in the formula (1) can be determined according to the following formula (3) from the turning radius of the vehicle (dump truck 20) and a yaw angular velocity obtained from the gyro sensor 102.

$$\text{Lateral acceleration} = (\text{turning radius}) \times (\text{yaw angular velocity})^2 \quad (3)$$

When the inclination angles of the body frame 22 have been calculated, the body frame inclination calculation processing (S801) by the body frame inclination calculating unit 112b is completed.

After completion of the calculation of the inclination angles of the vehicle 22, the correction amount calculating unit 112c refers to the value of the stop determination flag as set in step S703 or S708, and confirms whether or not the vehicle is at stop. If the vehicle is moving (the value of the stop determination flag: 0) (S802/NO), the process is forwarded to step S803, where the correction amount calculated at the time of the preceding sampling is maintained (S803). The correction amount so maintained is set as a correction amount for the calculation of a velocity vector, and the correction amount setting processing is completed.

If the vehicle is determined to be at stop (the value of the stop determination flag: 1; S802/YES), the process is forwarded to step S804, where the correction amount calculating unit 112c confirms, by using the loading state flag outputted from the loading determination unit 111a, whether or not the loading state has changed. If the loading flag at the time of the preceding sample is the same as that at the time of the current sampling (S804/no change), the process is forwarded to step S805.

If the current loading state flag is "loaded" (the value of the loading state flag: 1) (S805/YES), the process is forwarded to step S806, where the correction calculating unit 112c calculates a correction amount M by the recursive least squares method (S806). A description will hereinafter be made about the calculation method of the correction amount M by the correction amount calculating unit 112c.

First, the correction amount calculating unit 112c acquires outputs (αx, αy, αz) from the x-axis, y-axis and z-axis of the acceleration sensor 101, respectively. Expressing the relationship between these outputs (αx, αy, αz) and a gravitational acceleration vector (0, 0, g) by using the outputs Φ, φ from the body frame inclination calculating unit 112b, the relationship can be expressed like the formula (4) to be described below. Using this, a proportional coefficient matrix A is determined by the recursive least squares method. By calculating the inverse matrix of the proportional coefficient matrix A at the time of the current sampling as indicated by the following formula (5), the correction amount M can then be determined.

$$\left(\begin{pmatrix} \cos\psi & -\sin\psi & 0 \\ \sin\psi & \cos\psi & 0 \\ 0 & 0 & 1 \end{pmatrix} \begin{pmatrix} \cos\phi & 0 & \sin\phi \\ 0 & 1 & 0 \\ -\sin\phi & 0 & \cos\phi \end{pmatrix}\right)^{-1} \begin{pmatrix} \alpha_x \\ \alpha_y \\ \alpha_z \end{pmatrix} = A \begin{pmatrix} 0 \\ 0 \\ g \end{pmatrix} \quad (4)$$

$$M = A^{-1} \quad (5)$$

The correction amount calculating unit 112c stores the correction amount M obtained as a final result, and ends the processing.

If the current loading state flag is determined to be "unloaded" (the value of the loading state flag: 0), the process is forwarded to step S807, where the correction amount calculating unit 112c deletes the currently-set correction amount M and at the same time sets an identity matrix as a new correction amount (S807), and the processing at the correction amount calculating unit 112c is completed.

If the loading state flag in the preceding sampling is changed from "unloaded" to "loaded" in step S804 (S804/unloaded→loaded), the process is forwarded to step S806, where a matrix (correction amount M) as a correction amount is calculated by the recursive least squares method, the final result is stored, and the processing at the correction amount calculating unit 112c is completed.

If the loading state flag in the preceding sampling is changed from "loaded" to "unloaded" in step S804 (S804/loaded→unloaded), on the other hand, the process is forwarded to step S807, where the correction amount which has been already set is deleted, an identity matrix is set as a correction amount, and the processing at the correction amount calculating unit 112c is completed.

After completion of the correction amount setting processing at the correction amount setting unit 112, the process is forwarded to the velocity vector calculating processing (S506). From an output co of the gyro sensor 102, the correction amount M or identity matrix set at the correction amount setting unit 112, the roll angle φ and pitch angle Φ calculated at the body frame inclination calculating unit 112b, and a yaw angle θ calculated at the time of the preceding sample, the velocity vector calculating unit 113 calculates a velocity vector as will be described hereinafter. (However, the initial value of the yaw angle is assumed to have been given).

From the correction amount M and the original acceleration sensor output value α, a corrected acceleration output value α' can be expressed like the following formula (6).

$$\begin{pmatrix} \alpha'_x \\ \alpha'_y \\ \alpha'_z \end{pmatrix} = M \begin{pmatrix} \alpha_x \\ \alpha_y \\ \alpha_z \end{pmatrix} \quad (6)$$

From the correction amount M and the original gyro sensor output value ω, a corrected angular velocity output value ω' can also be expressed like the following formula (7).

$$\begin{pmatrix} \omega'_x \\ \omega'_y \\ \omega'_z \end{pmatrix} = M \begin{pmatrix} \omega_x \\ \omega_y \\ \omega_z \end{pmatrix} \quad (7)$$

From these corrected acceleration and angular velocity, corrected inclination angles (corrected roll angle φ', corrected pitch angle Φ', corrected yaw angle θ' with the corrected angular velocity taken into consideration) after the detection axes 34 (see FIG. 2B) in the loaded state have been corrected to bring them into coincidence with the corresponding detection axes 33 (see FIG. 2A) in the unloaded state can be determined according to the following formulas (8), (9) and (10). It is to be noted that, when the identity matrix has been set as the correction amount M, the corrected acceleration output value α' coincides with the output value α from the acceleration sensor 101 and the corrected angular velocity output value ω' coincides with the output value ω from the gyro sensor 102. In the following description, it is thus only necessary to read the corrected acceleration as "an output from the acceleration sensor" and the corrected angular velocity as "an output from the gyro sensor".

Corrected roll angle φ'=arc sin [{(corrected acceleration in the lateral direction)−(lateral acceleration)/(gravitational acceleration)}] (8)

Corrected pitch angle Φ'=arc sin [{(corrected acceleration in the longitudinal direction)−(vehicle acceleration)/(gravitational acceleration)}] (9)

Corrected yaw θ'=(yaw angle at the time of the preceding sampling)+(corrected angular velocity along the vertical axis)×(sampling time) (10)

From these inclination angles, a rotation matrix C in the velocity direction is determined according to the following formula (11).

$$C = \begin{pmatrix} \cos\psi' & -\sin\psi' & 0 \\ \sin\psi' & \cos\psi' & 0 \\ 0 & 0 & 1 \end{pmatrix} \begin{pmatrix} \cos\phi' & 0 & \sin\phi' \\ 0 & 1 & 0 \\ -\sin\phi' & 0 & \cos\phi' \end{pmatrix} \begin{pmatrix} 1 & 0 & 0 \\ 0 & \cos\theta & -\sin\theta \\ 0 & \sin\theta & \cos\theta \end{pmatrix} \quad (11)$$

Once the rotation matrix C in the velocity direction is determined, a velocity vector V can be determined from an output value s of the wheel rotational speed sensor according to the following formula (12).

$$V = C \begin{pmatrix} s \\ 0 \\ 0 \end{pmatrix} \quad (12)$$

where $$\begin{pmatrix} s \\ 0 \\ 0 \end{pmatrix};$$

temporary velocity vector

The above-described temporary velocity vector is an uncorrected velocity vector having the direction of motion of the vehicle as calculated based on a velocity s (a scalar quantity) calculated from a wheel rotational speed outputted from the wheel rotational speed sensor 103 and outputs of the acceleration sensor 101 and gyro sensor 102 as detected in a loaded state.

After the velocity vector V has been calculated at the velocity vector calculating unit 113, the position calculating unit 114 updates the position according to the following formula (13) in step S507.

$$\text{Updated position} = (\text{the position at the time of the preceding sampling}) + (\text{velocity vector}) \times (\text{sampling time}) \quad (13)$$

According to this embodiment, even if by loading a load, the body frame inclines relative to the detection axes for an attitude of the body frame in an unloaded state and offsets occur on the detection axes for an attitude of the body frame in a loaded state, it is possible to calculate a correction amount required for bringing the former and later axes into coincidence with each other and to calculate the velocity vector of the vehicle by using the correction amount. The calculation of the position, which uses the wheel speed and body frame attitude (body frame direction), can be made highly accurate. Further, the use of the identity matrix as the correction amount at the unloaded time makes it possible to perform the calculation of the position with the former and latter detection axes being kept in coincidence while using the same calculation processing for the velocity vector as in the loaded state.

On an unmanned dump truck that autonomously travels without any operator on board, map information on a travel route for controlling the autonomous travel is often loaded. If this map information is applied to the position calculating system according to this embodiment, the accuracy of the calculation of a position can be improved by using one or more existing resources.

Second Embodiment of First Aspect

A second embodiment of the first aspect will next be described with reference to FIG. 9. In the first embodiment, the correction amount is calculated by the recursive least squares method every time when changed from an unloaded state to a loaded state (see step S806 in FIG. 8). In the second embodiment, on the other hand, a correction amount M for correcting an inclination of the body frame is first determined uniquely under the premise that the inclination angles of the body frame do not change practically every time when changed from an unloaded state to a loaded state. As the maximum loading capacity of the dump truck 20 is specified, this embodiment is preferred when the loaded state at the time of full loading is substantially constant and a load is loaded without being extremely biased to one side in the lateral or longitudinal of the body.

As the flow of processing in the second embodiment is substantially the same as that in the first embodiment except for processing at the correction amount setting unit 112, a description will be made about the correction amount setting processing only. FIG. 9 is a flow chart showing the flow of the correction amount setting processing in the second embodiment.

Figure 9:
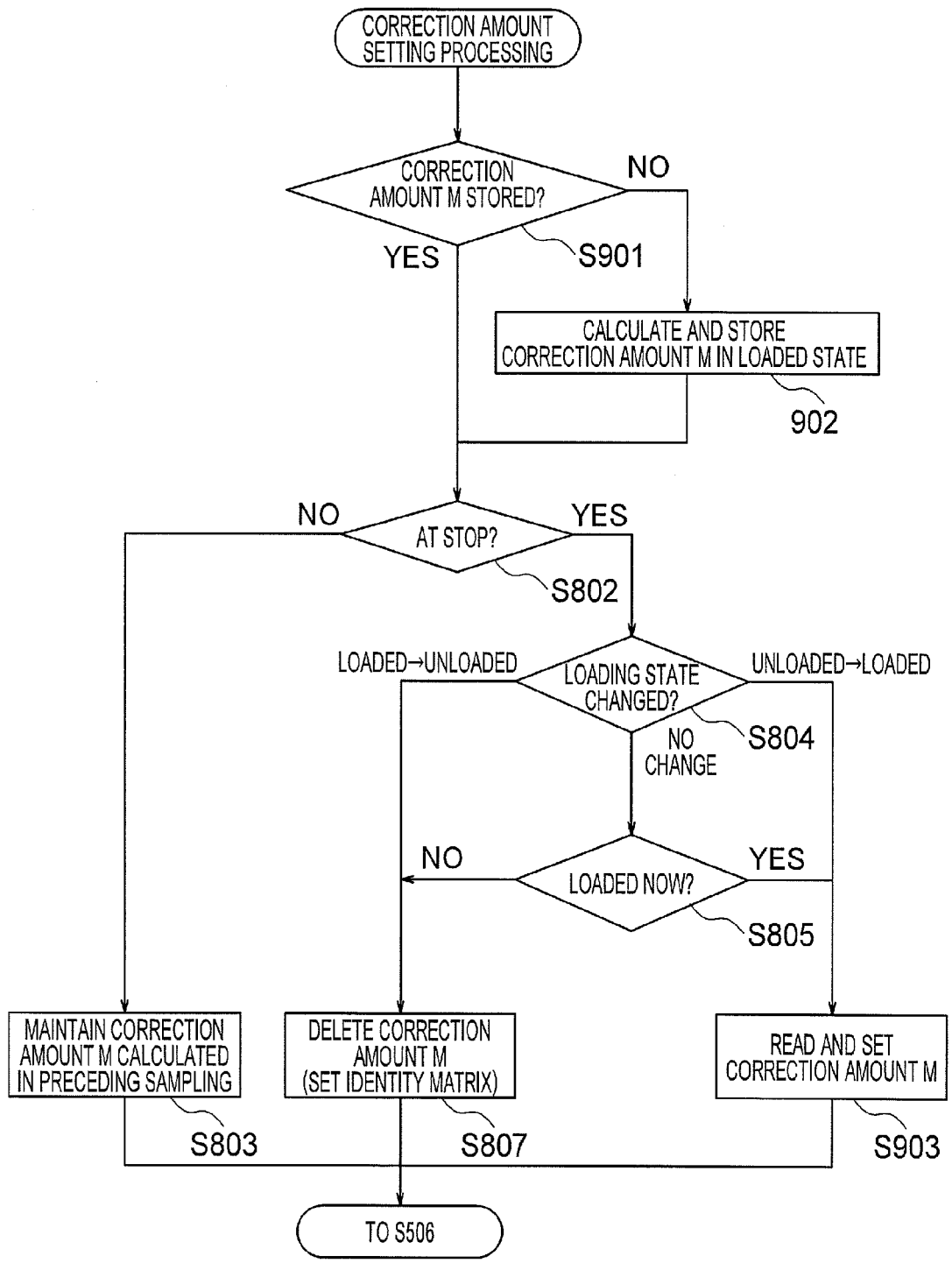
FIG. 9 is a flow chart showing the flow of correction amount setting processing in a second embodiment of the first aspect of the present invention.

As shown in FIG. 9, in the correction amount setting processing in the second embodiment, the correction amount calculating unit 112c in the correction amount setting unit 112 determines whether or not the correction amount M, which is required to bring the detection axes in the loaded state into coincidence with the corresponding detection axes in the unloaded state, is stored and, if not stored (S901/NO), the correction amount M is calculated and stored with a load being kept loaded on the dump truck 20 (S902). The calculation method of the correction amount M in step S902 is the same as that in the first embodiment.

If the correction amount M is stored (S901/YES) or the calculation of the correction amount M has been completed (S902), the correction amount calculating unit 112 determines whether or not the vehicle is at stop (S802). Subsequently, the processing of step S802 to step S805 and step S807 is similar to the corresponding processing in the first embodiment, and its repeated description is omitted herein.

If the dump truck 20 is at stop (S802/YES) and the loading state has changed from an unloaded state to a loaded state (S804/unloaded→loaded) or if no change has occurred in the loading state (S804/no change) and the current state is a loaded state (S805/YES), the process is forwarded to step S903.

The correction amount calculating unit 112c reads a correction amount from the correction amount storage unit in which the correction amount calculated beforehand is stored, and sets it as a correction amount for calculating a velocity vector (S903).

According to this embodiment, the processing load on the position calculating system can be reduced owing to the use of the uniquely-determined correction amount M without performing the correction amount setting processing every time when the inclination angles of the body frame are to be corrected.

First Embodiment of Second Aspect

Figure 10:
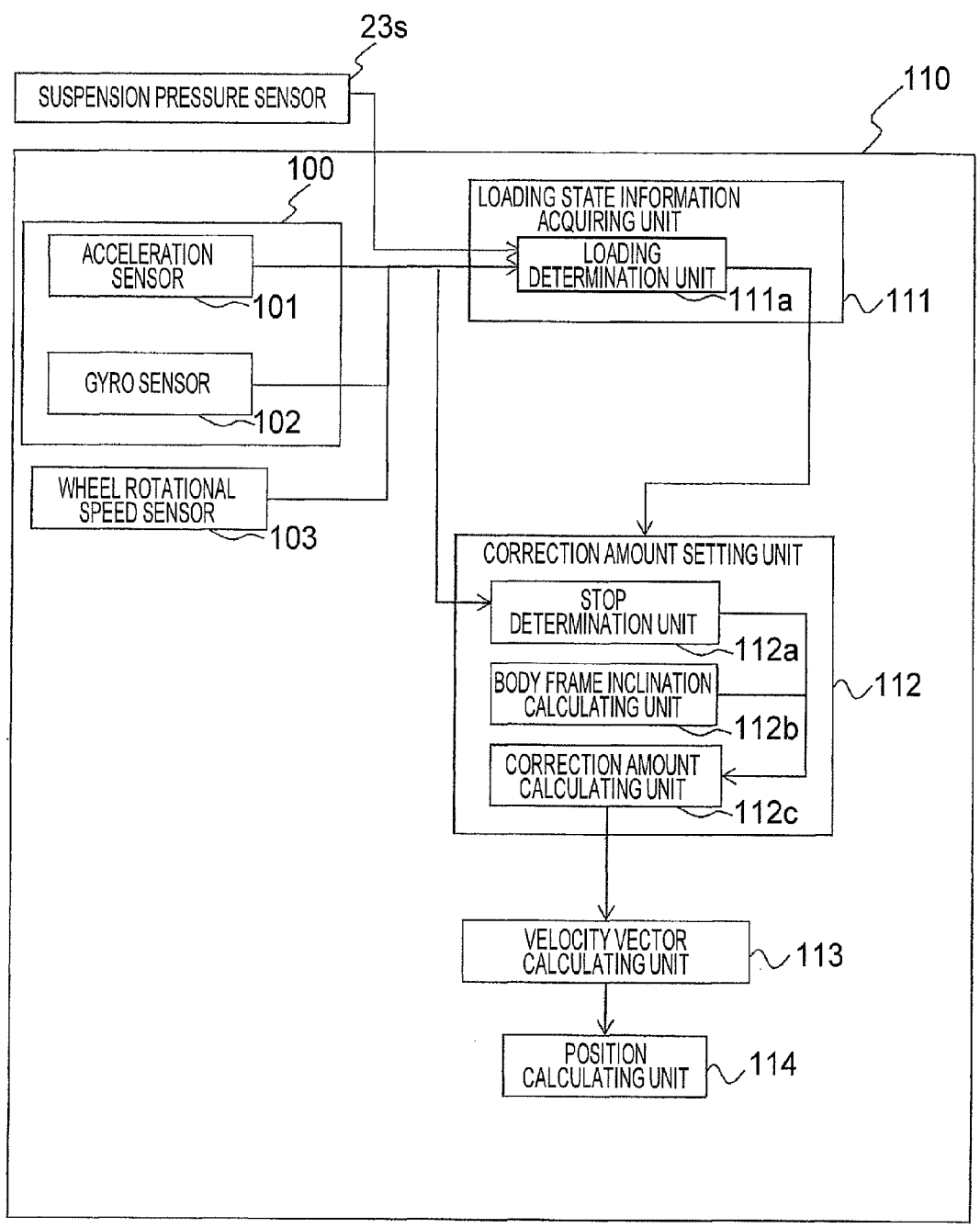
FIG. 10 is a functional block diagram depicting the internal configuration of a dump truck according to a first embodiment of the second aspect of the present invention.

A first embodiment of the second aspect uses a suspension pressure of the vehicle in the loading state determination processing instead of using the access map. The remaining configurations and processing details are similar to those in the first and second embodiments of the first aspect, and therefore their descriptions are omitted herein. With reference to FIGS. 10 and 11, a description will hereinafter be made about the first embodiment of the second aspect. FIG. 10 is a functional block diagram depicting the internal configuration of a dump truck according to the first embodiment of the second aspect. FIG. 11 is a flow chart showing the flow of loading state determination processing in the first embodiment of the second aspect.

As depicted in FIG. 10, at least one of the front left suspension, front right suspension, rear left suspension and rear right suspension of a dump truck 20 according to the first embodiment of the second aspect is provided with a suspension pressure sensor 23s for detecting the pressure of the associated suspension. The loading determination unit 111a in the position calculating system 110 and the suspension pressure sensor 23s are electrically connected so that an output of the suspension pressure sensor 23s is inputted to the loading determination unit 111a.

As shown in FIG. 11, the loading determination unit 111a acquires a current loading state flag (S1101). The loading determination unit 111a then reads, from a storage device, the suspension pressure measured by the suspension pressure sensor 23s at the time of the preceding sampling (S1102). The loading determination unit 111a then acquires a suspension pressure measured at the time of the current sampling (S1103).

The loading determination unit 111a calculates the absolute value of a difference between the current suspension pressure acquired in step S1103 and the suspension pressure at the time of the preceding sampling as read in step S1102, and determines whether or not the absolute value (the amount of a change in suspension pressure) is greater than a threshold level of the amount of pressure change (S1104). This threshold level of the amount of pressure change is a threshold level for determining whether the loading state has changed from a loaded state to an unloaded state or from an unloaded state to a loaded state, and is defined using the amount of a change in suspension pressure. If the amount of the change in suspension pressure is equal to or smaller than the threshold level of the amount of pressure change (S1104/NO), the loading determination unit 111a determines no change in the loading state and maintains the current loading state flag (S1105), and the processing at the loading determination unit 111a is completed.

If the amount of the change in suspension pressure is greater than the threshold level of the amount of pressure change (S1104/YES), the loading determination unit 111a determines whether or not the current suspension pressure is smaller than the predetermined pressure threshold level (S1106). This pressure threshold level is a threshold level for determining whether the loading state is an unloaded state or a loaded state, and is defined by the suspension pressure. As the pressure threshold level, the maximum value of suspension pressure in the loaded state may be set.

If the absolute value of the suspension pressure is equal to or greater than the pressure threshold level (S1106/NO), the loading determination unit 111a sets the loading state flag to be "loaded" (S1107). If smaller than the pressure threshold level (S1106/YES), the loading determination unit 111a sets the loading state flag to be "unloaded" (S1108).

According to this embodiment, the determination processing of a loading state can be performed without using an access map. Even if the dump truck 20 is a manned dump truck requiring no traffic control and no access map is loaded, loading status can, therefore, be performed and the position calculating process in the present invention can be applied by using the result.

If suspension pressure sensors are mounted for the detection of abnormality of the haulage vehicle, the application of an output from at least one of the suspension pressure sensors to the position calculating system in this embodiment can make improvements in the accuracy of position calculation by using one or more existing resources.

As another example of the processing by the loading determination unit 111a, it is possible to mention a method that monitors the relationship between the current position and the loading point and dumping point at the control center and determines the existence or non-existence of a load by communications from the control center. In this case, the vehicle side has, instead of an access map, a communication device that can perform communications with the control center, and receives a loading state flag from the control center.

With a manned dump truck, on the other hand, it is possible to configure such that an input device, which is connected to the position calculating system and is used to input a loading state indicating "loaded" or "unloaded", is arranged in the cab of the manned dump truck, the operator inputs a state signal of "loaded" or "unloaded" through the input device, and the loading determination unit 111a sets a value as the loading state flag according to the input signal.

The embodiments for practicing the present invention have been described above. The specific configuration of the present invention shall not be limited only to the above-described embodiments, and design modifications within a range that does not depart from the spirit of the present invention shall be included in the present invention. In the foregoing, for example, the angular velocity sensor and gyro sensor are used as attitude detection sensors, and their outputs are used as attitude detection parameters to calculate the inclination angles of the body frame. The inclination angle may be determined using an inclinometer as an attitude detection sensor without being limited to such angular velocity sensor and gyro sensor. In this case, two inclinometers may be provided, one having the y-axis (the lateral axis of motion of the vehicle) as a rotation center and being capable of detecting a roll angle, and the other having the x-axis (the longitudinal axis of motion of the vehicle) as a rotation center and being capable of detecting a roll angle. On the other hand, a yaw angle may be determined based on an output from a direction sensor.

The invention claimed is:

1. A position calculating system for being mounted on a haulage vehicle including wheels and a body frame which is mounted on the wheels via suspensions and carries a body mounted thereon, comprising:
   an acceleration sensor configured to measure acceleration applied to the body frame;
   a gyro sensor configured to measure rotation angular velocity of the body frame;
   a wheel rotational speed sensor configured to measure rotational speed of one of the wheels; and
   a calculating device configured to receive information from the acceleration sensor, information from the gyro sensor, and information from the wheel rotational speed sensor to calculate a position of the haulage vehicle based on the received information,
   wherein the calculating device is further configured to:
   determine whether the haulage vehicle is moving or at stop based on the information output from the wheel rotational speed sensor,
   determine whether the body frame is in a loaded state with a load carried thereon or in an unloaded state without a load carried thereon based on the information received from the acceleration sensor and the gyro sensor,
   when the haulage vehicle is determined to be at stop and a loading state of the body frame is determined to be changed from an unloaded state to a loaded state or determined to be in a loaded state, set a first correction amount required for bringing detection axes, which are to be used upon measuring the rotation angular velocity by the gyro sensor into coincidence with corresponding detection axes, which are to be used upon measuring the rotation angular velocity in an unloaded state,
   when the haulage vehicle is determined to be moving and the loading state of the body frame is determined to be changed from a loaded state to an unloaded state or determined to be in an unloaded state, set a second correction amount required for maintaining the detection axes, which are to be used upon measuring the rotation angular velocity by the gyro sensor,
   calculate a velocity vector of the haulage vehicle based on either the first correction amount or the second correction amount, and
   calculate a position of the haulage vehicle based on the velocity vector.

2. The position calculating system according to claim 1, further comprising a map information storage device that is connected to the calculating device and stores map information indicating a travel route which connects a loading point where the load is loaded and a dumping point where the load is dumped,
   wherein, the calculating device is configured to determine whether the loading point or the dumping point has been reached based on the position of the haulage vehicle as calculated by the calculating device and the map information, and
   wherein based on a result of determination whether the loading point or the dumping point has been reached, determine whether the body frame is in the loaded state or in the unloaded state.

3. The position calculating system according to claim 1,
   wherein the calculating device is connected to a suspension pressure sensor, which detects a pressure of one of the suspensions provided in the haulage vehicle, and
   wherein the calculating device is configured to compare an amount of pressure change detected by the suspension pressure sensor with a preset threshold level for determining whether the loading state of the haulage vehicle has changed from a loaded state to an unloaded state or a preset threshold level for determining whether the loading state of the haulage vehicle has changed from an unloaded state to a loaded state to determine whether the body frame is in a loaded state or in an unloaded state.

4. A haulage vehicle including wheels and a body frame which is mounted on the wheels via suspensions and carries a body mounted thereon, comprising a position calculating system which includes:
   an acceleration sensor configured to measure acceleration applied to the body frame;
   a gyro sensor configured to measure rotation angular velocity of the body frame;
   a wheel rotational speed sensor configured to measure rotational speed of one of the wheels; and
   a calculating device configured to receive information from the acceleration sensor, information from the gyro sensor, and information from the wheel rotational speed sensor to calculate a position of the haulage vehicle based on the received information,
   wherein the calculating device is further configured to:
   determine whether the haulage vehicle is moving or at stop based on the information output from the wheel rotational speed sensor,
   determine whether the body frame is in a loaded state with a load carried thereon or in an unloaded state without a load carried thereon based on the information from the acceleration sensor and the gyro sensor,
   when the haulage vehicle is determined to be at stop and a loading state of the body frame is determined to be changed from an unloaded state to a loaded state or determined to be a loaded state, set a first correction amount required for bringing detection axes, which are to be used upon measuring the rotation angular velocity by the gyro sensor, into coincidence with corresponding detection axes, which are to be used upon measuring the rotation angular velocity in the unloaded state,
   when the haulage vehicle is determined to be moving and the loading state of the body frame is determined to be changed from a loaded state to an unloaded state or determined to be in an unloaded state, set a second correction amount required for maintaining the detection axes, which are to be used upon measuring the rotation angular velocity by the gyro sensor,
   calculate a velocity vector of the haulage vehicle based on either the first correction amount or the second correction amount, and
   calculate a position of the haulage vehicle based on the velocity vector.

* * * * *